INVENTOR.
HENRY W. WESSELLS, III

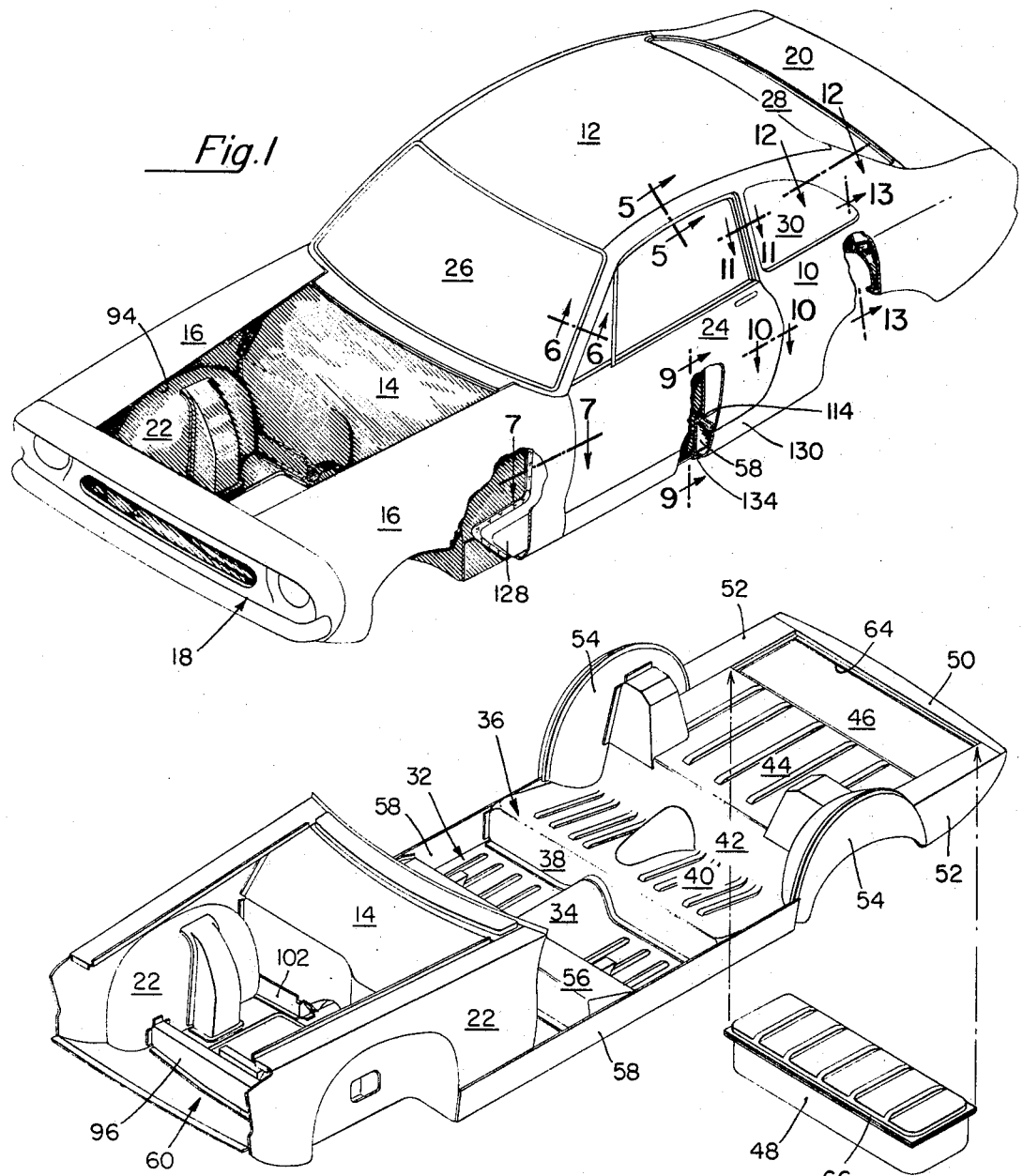

ATTORNEY

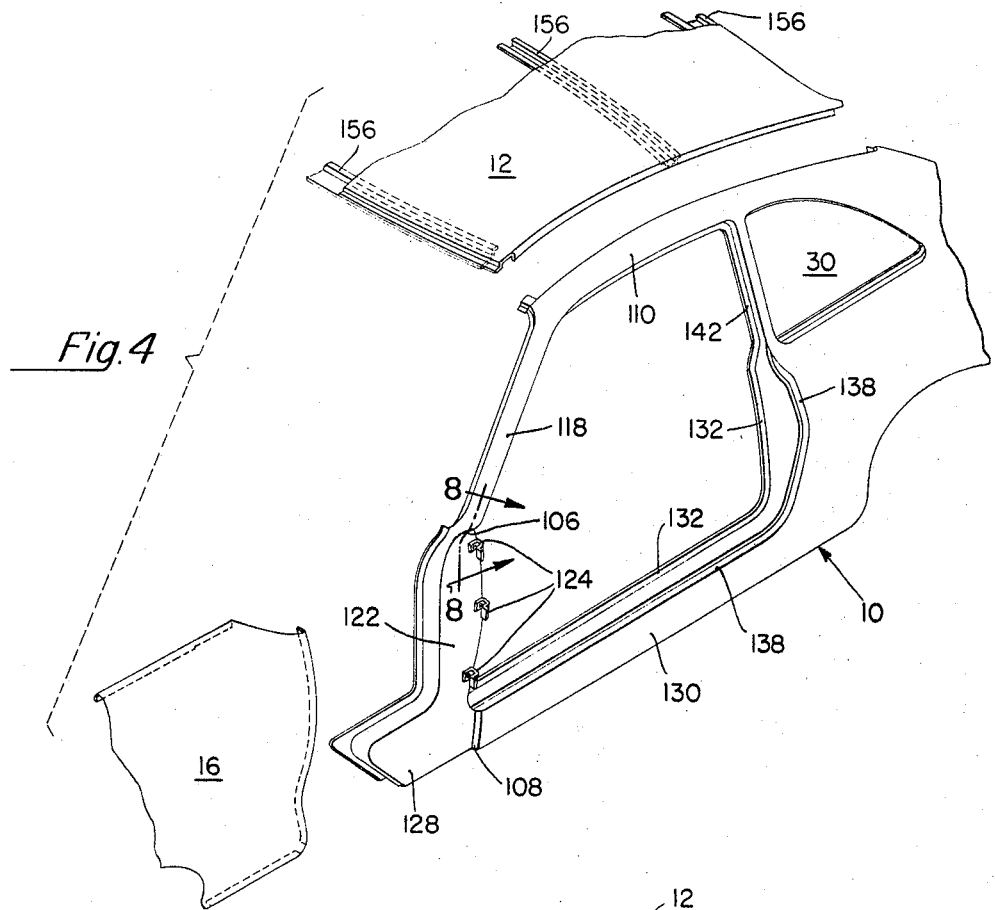
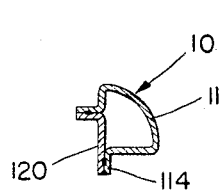
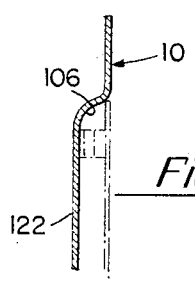
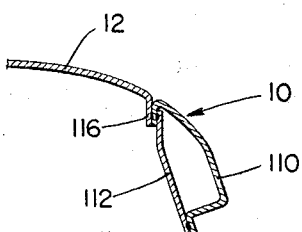
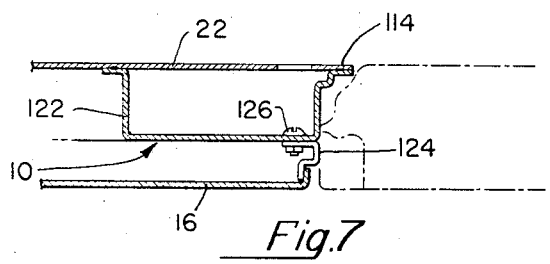
INVENTOR.
HENRY W. WESSELLS, III United States Patent Office 3,423,123
Patented Jan. 21, 1969

3,423,123
UNITIZED LIGHTWEIGHT SEDAN AUTOMOBILE BODY CONSTRUCTION
Henry W. Wessells III, Paoli, Pa., assignor to The Budd Company, Philadelphia, Pa., a corporation of Pennsylvania
Filed Jan. 4, 1967, Ser. No. 607,224
U.S. Cl. 296—28          15 Claims
Int. Cl. B62d 23/00

ABSTRACT OF THE DISCLOSURE

A unitized lightweight automobile body in which separate longitudinally extending side sills have been eliminated by utilizing body sheet panels as shear panels for supporting the vehicle. An inexpensive body structure is provided by using the uniside skin panels as the principal load-carrying structure and combining the skin panels with interior and exterior components for producing a strong and rigid body composed of a minimum number of parts.

---

This invention relates to a unitized lightweight sedan automobile body construction and has for an object the provision of improvements in this art.

Herein there is disclosed an improved sedan automobile body construction, having side panels and a connecting roof, wherein uniside panels in the main passenger region, from A-posts to the rear end, are formed largely of outer skin elements or panels, suitable connecting load-bearing and stiffening (i.e. reinforcing) means being provided for transferring stresses between the unitized outer side panels and the interior load-applying and load-transmitting structures; and wherein at the A-post and forwardly thereof this outer skin structure is converted into an interior under-skin structure which includes deep wheelhouse girder members, which in final assembly form, in effect, rigid continuations of the uniside panels. The main uniside skin panels form the principal load-carrying structures of the body and, by a judicious design and employment of interior and exterior components with these principal structures, there is produced a very strong and rigid body structure of very lightweight and composed of a minimum number of parts of relatively simple shape. Thus the cost of parts, tooling, and assembly is minimized.

A particular feature of the invention is the provision of a body construction which utilizes shear panels to avoid, as far as possible, the use of box structures.

Another feature is the provision of a body construction in which an improved floor panel, with front and rear extensions and reinforcements, cooperates with the improved uniside panels to provide a very strong, rigid, lightweight body.

Another feature is the provision of a body construction in which strong connecting structures are secured between the floor and side panels in the wheelhouse regions for absorbing wheel loads and spreading them without heavy stress concentration zones into the floor and side panel structures.

Another feature is the provision of a body construction which comprises cross members of improved design, particularly in the forward regions, which provide for attachment of the lower suspension arms and engine mounts to act as hard points for tuning these, as well as to distribute loads into the sheet metal structure.

Another feature is the provision of an improved body construction which has no separate side sill structure—a kind of no-sill construction—in which the uniside panels and floor panel, together with suitable connecting and reinforcing elements therebetween, furnish satisfactory substitute side sill structure.

Another feature is the provision of an improved body construction in which the roof is suitably formed and connected to the uniside panels in such manner as to form a strong load-carrying component which is easily formed and assembled.

Another feature is the provision of an improved body construction which has no rear side sills, as such, the function being served by a judicious formation and assembly of the rear end portions of the uniside panels, as rear fender quarter panels, inner quarter panels, wheelhouse structures, and related components.

Another feature is the provision of an improved body construction in which various components, which in usual constructions are not loaded components, are so combined with the usual necessary components, as by a "stove lid" interfit, as to cause them to provide structural load-carrying continuity and avoid the need to provide further reinforcing structure.

Another feature is the provision of an improved body construction in which the necessary body components, that is, the minimum parts which are needed to make a coherent structure and an outer cover of acceptable strength and appearance, are used extensively as load-carrying components, thus minimizing the need to use auxiliary reinforcing members.

The above and other objects and features of the invention, as well as various advantages, will be apparent from the following description of an exemplary embodiment, reference being made to the accompanying drawings, wherein:

FIG. 1 is a front-to-side perspective view of a unitized sedan automobile body construction embodying the invention;

FIG. 2 is a similar perspective view of the body with the outer cover or skin portions removed;

FIG. 4 is a perspective view of the main uniside panel and disassembled roof panel and front fender side quarter panel;

FIG. 5 is an enlarged transverse section in the side-panel-to-roof joint area, the section being taken on the line 5—5 of FIG. 1;

FIG. 6 is an enlarged transverse section in the windshield zone, the section being taken on the line 6—6 of FIG. 1;

FIG. 7 is an enlarged transverse section in the A-post zone, the section being taken on the line 7—7 of FIG. 1;

FIG. 8 is an enlarged vertical transverse section taken on the line 8—8 of FIG. 4, the front fender quarter panel being brought into assembled position and a door being shown in broken or phantom lines;

Figure 3:
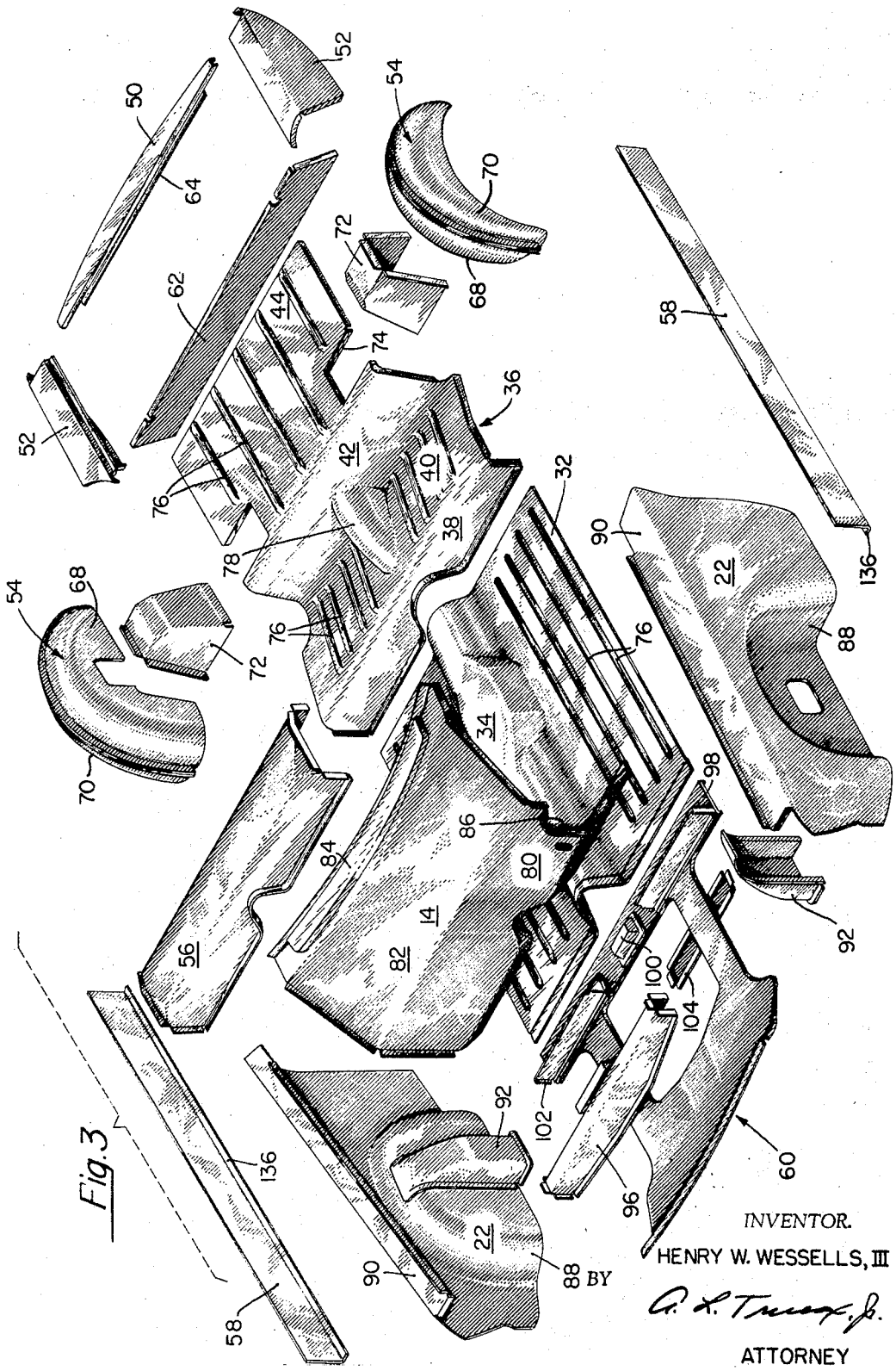
FIG. 3 is an enlarged exploded perspective view of the parts shown in FIG. 2.

As shown in FIG. 1, a two-door two-seat sedan body, in general, comprises uniside outer skin panels 10 on each side, a roof panel 12, a cowl structure 14, front fender side quarter panels 16, a front end assembly 18, a rear end skin cover assembly 20, an inner front wheelhouse girder structure 22, which in assembly is unitized with a uniside panel on each side, together with side doors 24, a rear window 28, and rear side windows 30.

In FIG. 2 it is further shown that there is a main floor panel 32 with a raised medial transmission-housing tunnel portion 34; a rear floor panel 36 with a front or seat kick-up portion 38, a rear-seat deck portion 40, a second or bridge kick-up portion 42 ahead of a rear wheel zone, and a rear deck portion 44 ahead of an opening 46 for a fuel tank 48 (shown exploded below); a rear end cross-member structure 50— rear inner angular quarter panel structures 52; rear wheelhouse structures 54; a front seat base cross member 56 secured to the main floor panel; longitudinal vertical floor-to-side-panel-connceting and reinforcing plate structures 58; and front floor panel structure 60, which may be regarded as an extension of the main floor panel, which latter often is referred to as the front floor panel in most body constructions.

The rear floor deck panel 44 is reinforced and stiffened by a rear vertical cross member 62 which forms the front edge of the fuel tank opening 46. The tank opening is surrounded by dropped or downwardly recessed flanges 64 and the tank 48 has a circumferential flanged support rib 66 which fits tightly in this space in "stove-lid" fashion to add strength across the opening.

The rear wheelhouse structure 54 is formed of two arcuate pan-shaped stamping 68, 70, and the inner one has secured to it, as by weld joints, a box-like vertical shear member 72 which fits into a recess 74 in the rear floor deck 44 and is secured therein, as by welded mating flanges. The members 72 anchor the rear shock struts of the rear axle housings and distribute the loads, largely in shear, between the floor and wheel housings and related parts.

The rear floor deck 44, the rear seat deck 40, and the sides of the main floor panel 32 are strengthened and rigidified by pressed-in ribs 76; and main floor panel is strengthened and rigidified by the tunnel portion 34; and the rear floor panel is further rigidified and strengthened by the kick-up portions 38 and 42 and also by the pressed in tunnel portion 78.

The main floor panel is strengthened and stiffened near the front by the seat base cross member 56; at the front end it is secured to the bottom of the vertical dash portion 80 of the firewall or dashboard portion of the cowl structure 14. A rearwardly inclined portion 82 of the firewall or dashboard is surmounted by a cowl deck 84. The portion 80 is recessed from the side at 86 and cupped forwardly for a steering column and related parts.

The front wheelhouse girder structure 22 has a pressed-in pan-shaped wheelhouse portion proper 88 and at the top has a wide bent-over horizontal hood deck panel portion 90, both strengthening and stiffening the structure. In addition, there is strongly secured to the inner side of the portion 80 and to the front floor 60, as by flange weld joints, a box-like strut and wheel mount attachment shear member 92 which further stiffens and strengthens the structure 22 and transfers support loads to and between the structures 22 and 60.

The front fender outer skin quarter panels 16 are secured to the structures 22 and related parts and these quarter panels, together with adjacent parts around the hood deck panel opening 94, provide stiffening around the opening and "stove-lid" anchorage support for a hood deck cover panel (not shown) whereby the hood deck panel, when installed, is made to transmit loads across the opening.

The front floor panel is reinforced by an inverted channel-shaped or hat-shaped front engine-mount cross member structure 96, suitably secured, as by flange weld joints, to the front floor panel and to the cup-shaped inner sides of the recessed wheelhousing portions 88.

Rearwardly, where it is secured to the main floor panel and to the firewall, the front floor panel is stiffened by a flanged transverse portion 98 which carries the rear resilient engine support 100. On each side of the shaft space in the middle the beam-like portion 98 is reinforced by attached flanged plate members 102 and medially, below the shaft zone, the portion 98 is reinforced by an attached flanged closed-end channel-shaped or hat-shaped transverse beam-like member 104.

Each uniside panel 10 comprises an outer skin portion except at the A-post region where it is depressed or jogged inward in the door hinge zone, i.e., from an upper jogged or kick-in point 106 to a lower jogged or kick-in point 108 to form a below-skin portion. Forward of the A-post, the front wheelhouse girder panel 22, which in final assembly is rigidly attached to the main uniside panel, forms a continuation of the within-skin portion at the door hinge zone. The strong and rigid structure provided at the front makes the use of front box side sills, as such, unnecessary.

FIGS. 5 to 13 provide representative illustration of the sectional shape and connections of the uniside panel.

FIG. 5 shows that the top rail portion 110 of the uniside panel 10 in the door area is relatively deep vertically and reinforced by a box-like section closing filler panel sheet 112, the parts being secured together at the bottom by a downturned flange weld joint 114 to form a stop in the door recess, and being secured together and to a side flange of the roof panel 12 at the top in a flange weld joint 116.

The inner side of the weld joint 116 is enclosed but there are various known methods of making such welds, one being to provide weld gun access openings in the box-closing panel 112.

In the windshield rail section, FIG. 6, the uniside panel window rail portion 118 is smaller in section but the inturned flange weld joint 114 is continued as a door stop in the door opening. The closing flange weld joint with the box-closing filler strip 120 is altered, as compared to the roof joint 116, to form a recessed stop for the windshield or its retaining means.

In the door hinge section, FIGS. 7 and 8, where the uniside panel is depressed between the jogs 106 and 108, the panel 10 is altered to form a flanged inwardly open A-post channel portion 122 which is closed on the inner side by the forward edge of the front wheelhouse girder panel 22. The inturned flange weld joint 114 is maintained as a continuation of the door stop around the door opening. Bent clips 124, or a continuous formed strip, are secured to the A-post portion 122, as by bolts 126, for the securement of the outer front fender skin quarter panel 16. The lower part of the A-post portion 122 has a forwardly extending horn-like projecting portion 128 to provide greater strength and stiffness in the connection with the firewall 14, the girder-like wheelhouse panel 22, the side reinforcing structure 58, and related parts.

Figure 9:
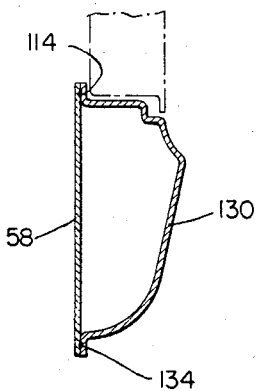
FIG. 9 is an enlarged vertical transverse section in the side-panel-to-floor door area, the view being taken on the line 9—9 of FIG. 1.

In the bottom rail portion 130, shown in cut-away section in FIG. 1 and in FIG. 9, the uniside panel structure 10 has an inwardly opening channel section with an upstanding inner flange 132 which has a weld joint with the upper edge of the floor reinforcing structure 58 to maintain the door stop flange joint 114 around the door opening and a jog and inturned flange at the botom to be secured in a flange weld joint 134 to the main floor panel and to an inturned bottom flange 136 of the floor reinforcing structure 58.

Figure 10:
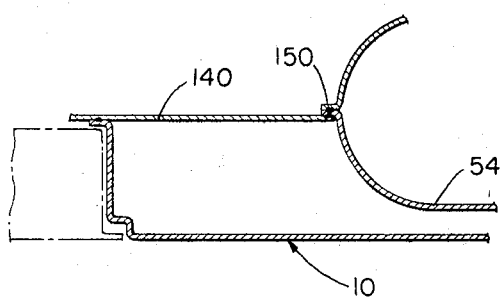
FIG. 10 is an enlarged transverse section in the B-post zone, the section being taken on the line 10—10 of FIG. 1.

A jogged recess 138 is formed in the outer part of the bottom rail portion 130, as shown in FIGS. 4 and 10, and this jogged recess continues upward in the B-post structure at the rear edge of the door opening up to the bottom of the rear window opening. The inner flange 132 continues to the top of the rear side of the door opening. An inner panel 140 is secured to the inner flange 132 in the B-post region on the rear side of the door opening.

In front of the rear window opening 30 (FIG. 11) the B-post extension portion 142 assumes a rearwardly open flanged channel section, similar to but smaller than the A-post section. The channel is closed by a filler strip 144 to form a closed box setcion in front of the window. The inner side web of this channel portion 142 continues around the rear window. A bent reinforcing box-closing member 146 is secured to this web around the window opening. At the lower edge the window rail is secured, as by weld joints to the lower inner panel 140.

Figure 12:
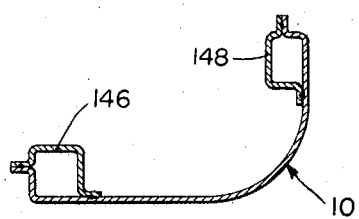
FIG. 12 is an enlarged transverse section in the area between side and rear windows, the section being taken on the line 12—12 of FIG. 1.

The upper flanged edge of the roof rail portion 110 (FIG. 5) continues beyond the rear end of the roof panel 12 to form stiffening and connectig means all the way to the rear end of the uniside panel. As shown in FIG. 12, it may be reinforced by a flanged channel-shaped box-closing member 148.

Figure 13:
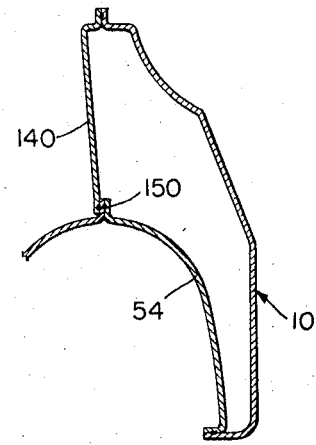
FIG. 13 is an enlarged transverse section in the rear fender quarter panel and wheelhouse zone, the section being taken on the line 13—13 of FIG. 1.
Figure 11:
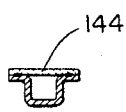
FIG. 11 is an enlarged transverse section in the upper B-post and rear window area, the section being taken on the line 11—11 of FIG. 1.

In the rear wheelhouse zone, as shown in FIGS. 1 and 13, the rear inner panel 140 is secured, as by weld joints 150, to the flanged medial portion of the wheelhouse structure 54. At the bottom both the outer fender quarter panel and the outer part of the wheelhouse structure are provided with horizontal inturned flange portions which are secured together in a weld joint connection 152.

The rear inner fender quarter panel 52 is angular in vertical section, as shown in FIG. 2, and by suitable flange weld joints is secured to the rear wheelhouse, to the rear floor deck 44, to the rear end structure, and to the outer skin fender quarter panel of the uniside structure. The rear part of the top of the outer fender quarter panel is also secured, as by suitable weld joints, to the angular rear end outer skin cover assembly 20; and the rear end cover assembly being secured, as by flange weld joints, to the rear end structure 50.

The roof panel 12 is reinforced by flanged channel-shaped transverse stiffening members 156 welded to the lower surface of the panel.

It is seen that the boxed edge-flange outer skin uniside panels provide great strength and rigidity, and when connected to a roof panel, floor panel, front interior wheelhouse girder panel, and cowl structure, rear interior wheelhouse structure, rear interior quarter panel, and other related parts, these uniside panels form the body framing and much of the outer skin covering of the body.

The front floor panel with its reinforcements and connections with the front wheelhouse girder panels forms with them and related parts a very strong rigid front end structure of lightweight which makes the use of front side sills unnecessary.

The box-like floor-to-side anchorage members 72 and 94 form strong stiff load absorbing and distributing structures, acting largely in shear, connecting adjacent structures in the rear and front wheel regions.

The double kick-up or stepped rear floor panel 42 provides great strength and rigidity, especially at the zones of heavy loading around the shear box structures 72.

The connections of the front ends of the uniside panels with the rear ends of the front wheelhouse girder panel structure, especially in the forward horn extension portions 128, together with the adjacent cowl and floor connections, furnishes a very strong rigid continuation of the uniside panel structures in the completed body.

The connections around the uniside panels, especially to the roof panel, to the floor panel, to the rear wheelhouse structure, and to the rear inner quarter panel, are designed for easy assembly access, great strength, and light weight.

While one embodiment of the invention has been disclosed for purposes of illustration, it is to be understood that there may be various embodiments and modifications within the general scope of the invention.

What is claimed is:

1. A unitized lightweight automobile body construction comprising in combination: a main floor panel having a medial tunnel formed therein, a rear floor panel connected to said main floor panel and having a rear seat kick-up portion and a rear bridge kick-up portion, floor panel reinforcing flanges connected to the sides of said main and said rear floor panels, rear wheel housings connected to said rear floor panel and said reinforcing flanges, a formed firewall and cowl structure connected to the front of said main floor panel, a front floor panel connected to the front of said main floor panel and to said firewall and cowl structure, formed front wheel house panels connected to said front floor panel, said main floor panel and said firewall and cowl structure forming a rigid reinforcement therewith, and body panels, each comprising an exterior rear quarter panel connected to said wheel housing and said rear floor panel, and a uniside panel having a hinge post, an exterior A-post, an exterior roof rail, an exterior B-post and an exterior sleeper panel formed therein, said uniside being connected to said quarter panel, said main floor panel, said rear floor panel, said floor panel reinforcing flange and said front wheel house panel, forming a lightweight automobile body construction therewith.

2. A unitized lightweight automobile body construction as set forth in claim 1, wherein said front wheel house panels include a hornzontal hood deck panel connected to said firewall and cowl structure.

3. A unitized lightweight automobile body construction as set forth in claim 2, which further includes exterior front fenders connected to said uniside panels and to said horizontal hood deck panels.

4. A unitized lightweight automobile body construction as set forth in claim 3, which includes a front end assembly connected to said front floor panel, said front wheel housings and said front fenders, and forming a rigid structure therewith.

5. A unitized lightweight automobile body construction as set forth in claim 1, which further includes a channel-shaped seat base cross-member connected to said main floor panel and said reinforcing flanges.

6. A unitized lightweight automobile body construction as set forth in claim 1, which further includes box-like shear reinforcement members connected to said wheel house panels and said front floor panel.

7. A unitized lightweight automobile body construction as set forth in claim 6, which further includes a front engine support mount, a rear engine support mount and reinforcement plates connected to said front floor panel.

8. A unitized lightweight automobile body construction as set forth in claim 1, which further includes a roof panel connected to said body panel at said uniside roof rail and transverse roof beams connected to said roof panel.

9. A unitized lightweight automobile construction as set forth in claim 8, which further includes longitudinal flanges on said roof panel and said roof rail, and a box closing panel interconnected to form a closed box roof sill.

10. A unitized lightweight automobile body construction as set forth in claim 9, which further includes a rear end cover assembly connected to said body panels at said rear quarter panels.

11. A unitized lightweight automobile body construction as set forth in claim 10, which further includes flanged channel reinforcing members connected to said body panels at the side and rear window openings forming closed box sills therewith.

12. A unitized lightweight automobile body construction as set forth in claim 1, which further includes vertical shear members connected to said rear floor panel at said rear bridge kick-up portion and to said wheel housings.

13. A unitized lightweight automobile body construction as set forth in claim 1, which further includes inner rear quarter panels connected to said wheel housings, said rear floor panels and to said body panels at said exterior rear quarter panels for forming closed boxes at the rear of the wheel housings.

14. A unitized lightweight automobile body construction as set forth in claim 13, which further includes inner panels connected to said rear floor panels, said wheel housings and to said exterior rear quarter panels forming closed boxes at the front of the rear wheel housings.

15. A unitized lightweight automobile body construction as set forth in claim 13, which further includes a pair of transverse cross-members connected to said rear inner quarter panels and forming an opening at the rear of said rear floor panel for supporting a fuel tank.

References Cited

UNITED STATES PATENTS 2,733,096  1/1956  Waterhouse et al. _____ 296—28

FOREIGN PATENTS 1,139,396  11/1962  Germany.

BENJAMIN HERSH, *Primary Examiner.*

L. D. MORRIS, JR., *Assistant Examiner.*